United States Patent [19]

Firey

[11] Patent Number: 5,231,821
[45] Date of Patent: Aug. 3, 1993

[54] CYCLIC CHAR FUEL OXIDATION REACTORS WITH CROSS FLOW PRIMARY REACTORS

[76] Inventor: Joseph C. Firey, P.O. Box 15514, Seattle, Wash. 98115-0514

[21] Appl. No.: 935,270

[22] Filed: Aug. 27, 1992

Related U.S. Application Data

[62] Division of Ser. No. 731,208, Jul. 15, 1991, Pat. No. 5,177,953.

[51] Int. Cl.⁵ .............................................. F02C 3/28
[52] U.S. Cl. ................................... 60/39.12; 60/39.464
[58] Field of Search .................... 60/39.12, 39.464; 110/297, 300, 302, 305, 308

[56] References Cited

U.S. PATENT DOCUMENTS

| | | | |
|---|---|---|---|
| 2,448,969 | 11/1949 | Dietter | 60/39.12 |
| 4,240,785 | 12/1980 | Crawford | 60/39.464 |
| 4,509,957 | 4/1985 | Firey | 60/39.12 |
| 4,698,069 | 10/1987 | Firey | 60/39.12 |
| 4,889,539 | 12/1989 | Firey | 60/39.12 |

Primary Examiner—Louis J. Casaregola

[57] ABSTRACT

Reacted gas reservoirs and reactant gas manifolds are added to the primary reactors of cyclic char fuel oxidation reactor plants in order to create a flow of gas across the direction of motion of the solid char fuel. A larger and more stable rapid char fuel primary reaction zone can be created by use of cross flow, and separation and improved utilization of char fuel volatile matter can be achieved.

13 Claims, 8 Drawing Sheets

CYCLIC CHAR FUEL OXIDATION REACTORS WITH CROSS FLOW PRIMARY REACTORS

CROSS REFERENCES TO RELATED APPLICATIONS:

This application is a divisional application from my earlier filed application entitled, Cyclic Char Fuel Oxidation Reactors with Cross Flow Primary Reactors, Ser. No. 07/731208, filed Jul. 15, 1991, now U.S. Pat. No. 5,177,953, and contains subject matter related to that in my following U.S. patent applications:
1. Cyclic Char Fuel Oxidation Reactor With Opposed Cross Flow Primary Reactor, Ser. No. 07/848545, filed March 1992 now U.S. Pat. No. 5,193,338.
2. Producer Gas Reservoirs for Cyclic Char Fuel Oxidation Reactors, Ser. No. 07/895735, filed Jun. 9, 1992 now U.S. Pat. No. 5,205,022.

BACKGROUND OF THE INVENTION

1. Field of the Invention

This invention is in the field of cyclic char fuel oxidation reactor plants wherein several char fuel masses within several separate primary reactors are first compressed with reactant air from a separate compressor followed by expansion of resulting reacted gas into a separate expander and this cycle of compression followed by expansion is repeated.

2. Description of the Prior Art

The following U.S. Patents describe several example types of cyclic char fuel oxidation reactor plants with which the improvements of this invention can be used:
U.S. Pat. No. 4,455,837; J. C. Firey, Jun. 26, 1984
U.S. Pat. No. 4,484,531; J. C. Firey, Nov. 27, 1984
U.S. Pat. No. 4,509,957; J. C. Firey Apr. 9, 1985
U.S. Pat. No. 4,568,361; J. C. Firey, Feb. 4, 1986
U.S. Pat. No. 4,707,991; J. C. Firey, Nov. 24, 1987

In all of these example cyclic char fuel oxidation reactor plants the gaseous reactants, such as air, are compressed into the pore spaces of the char fuel contained within several primary reactors inside pressure vessel containers. Primary reaction of the gaseous reactants with the char fuel occurs within the pore spaces during compression. Expansion of these primary product gases then occurs out of the pore spaces of the char fuel. In some forms of cyclic char fuel oxidation reactor plant the primary product gases are further reacted with additional reactant gases in a secondary reaction within a secondary reaction chamber during expansion. This cycle of gas compression followed by expansion is repeated for each of the pressure vessel containers, with fresh gaseous reactants being supplied for each compression and with final product reacted gases being removed during each expansion. The descriptions of cyclic char fuel oxidation reactor plants contained in the above listed U.S. patents are incorporated herein by reference thereto. The compressors of these plants are separate from the expanders thereof, but may be driven thereby, as for example where a centrifugal compressor is driven via its input shaft by the output shaft of a gas turbine engine expander.

Several char fuel containers are used on these cyclic char fuel oxidation reactor plants and these are pressure vessel containers whose number at least equals the sum of the number of compressor stages plus the number of expander stages. Each of these containers is fitted with a refuel means for adding char fuel into the refuel end of the primary reactor and an ash removal means for removing ashes or spent char fuel material from the ash removal end of the primary reactor.

The compressor means of these cyclic char fuel reaction plants comprise one or more stages, as defined in the material incorporated by reference, and each such stage has a delivery end outlet at its high pressure end through which the compressed gas may flow out of a stage and into a connected char fuel container. The expander means of these cyclic char fuel reaction plants may be a work producing engine and comprise one or more stages, as defined in the material incorporated by reference, and each such stage has an inlet at its high pressure end through which the reacted gas may flow into the expander stage from the connected char fuel container. The expander can be a simple blow down expander of low cost. But in many cyclic char fuel oxidation reactor plants we will prefer to use an expander engine, such as a gas turbine in order to recover the available work of expansion. This expander engine work can be used to drive the compressor and to generate output work via a means for absorbing expander work such as an electric generator.

Each container has separate changeable gas flow connections to each delivery end outlet of each compressor stage and to each inlet of each expander stage and these changeable gas flow connections comprise means for opening and closing these connections while the plant is operating. These several means for opening and closing are controlled by a means for controlling the opening and closing of the changeable gas flow connections so that:

1. Each container is opened for a time period to each outlet of each stage of the compressor, in a sub sequence of time periods of open gas flow connections to compressor stage outlets, proceeding in time order of increasing compressor stage delivery pressure.
2. Each container is opened for a time period to each inlet of each stage of the expander, in a sub sequence of time periods of open gas flow connections to expander stage inlets, proceeding in time order of decreasing expander stage inlet pressure.
3. A sub sequence of gas flow connections to expander stage inlets follows after each sub sequence of gas flow connections to compressor stage outlets, and these sub sequences are repeated.
4. During any one time period of these sub sequences of connections each container is open gas flow connected to but one stage of either the compressor or the expander.
5. During any one time period of these sub sequences of connections each stage is open gas flow connected to but one container.

Additional detailed descriptions of char fuel containers and changeable gas flow connections are presented in the material incorporated by reference, for example in U.S. Pat. No. 4,509,957, col. 14, line 46 through line 58, and col. 18, line 39 through line 52.

As used herein and in the claims the term char fuel is as defined in U.S. Pat. No. 4,509,957, col. 2, line 58 through 68, and in U.s. Pat. No. 4,455,837, col. 4, line 8 through line 16, and this material is incorporated herein by reference.

As used herein and in the claims the terms oxygen gas, and a gas containing appreciable oxygen gas, are as defined in U.S. Pat. No. 4,509,957, col. 3, line 1 through line 8 and in U.S. Pat. No. 4,455,837, col. 4, line 1 through line 7, and this material is incorporated herein by reference.

A means for preheating the char fuel within the primary reaction chamber is used to bring the char fuel up to that temperature at which it will react rapidly with oxygen in adjacent compressed gases while the plant is being started. Thereafter the means for preheating the char fuel can be turned off when the heat of the primary reaction becomes sufficient to keep the char fuel at or above this rapid reaction temperature. During starting a cranking means is used to drive the compressor.

As char fuel is reacted to ashes within the primary reactor it is replaced by a refuel mechanism means for supplying fresh char fuel into a refuel end of the primary reactor. The char fuel is thus moved along through the primary reactor toward an opposite ash collection end of the primary reactor. Hence the char fuel being reacted within the primary reactor has a direction of motion from the refuel end toward the ash collection end. An ash removal mechanism is used as a means for removing ashes from the primary reaction chamber.

Where air is the reactant gas it is readily available from the atmosphere. In some applications oxygen enriched air or essentially pure oxygen may be used as the reactant gas, as for example in some gasifier uses, and here a source of oxygen rich gas is needed.

The term producer gas is used herein and in the claims to mean those reacted gases emerging from the primary reactor during expansion and this is normally a fuel gas containing carbon monoxide and other components.

The term secondary reacted gas is used herein and in the claims to mean those reacted gases within the secondary reactor, and for engines these are normally essentially complete combustion products containing carbon dioxide and other components.

For cyclic char fuel oxidation gasifiers the secondary reacted gas is normally also a producer gas since a secondary reaction is not used when char fuel gasification is the purpose.

The term fixed open gas flow connection is used herein and in the claims to mean a gas flow passage which remains open whenever the cyclic char fuel oxidation reactor is operating.

The term changeable gas flow connection is used herein and in the claims to mean a gas flow passage which can be opened or closed while the cyclic char fuel oxidation reactor plant is operating. A changeable gas flow connection is opened and closed by a means for opening and closing.

As the char fuel within the primary reactor moves along the char fuel motion direction, it is preheated by heat transfer from char fuel portions which are further along and are reacting rapidly with oxygen and thus are at a high temperature. Where the char fuel being used is essentially free of volatile matter, as with coke fuel, this preheat zone serves to bring the new char fuel up to its rapid reaction temperature. The char fuel then enters the rapid reaction zone and carbon reacts therein with oxygen to form producer gas. Beyond the rapid reaction zone in the direction of char fuel motion the char fuel is essentially completely reacted to ashes which pass into an ash collection zone at the end of the char fuel motion path.

When the char fuel being used contains volatile matter, as with bituminous coal, the preheat zone also serves to remove the volatile matter from the coal, in part by distillation and in part by reaction to volatile products. In the absence of oxygen, appreciable portions of this distilled volatile matter become tars and other portions become fuel gases of essentially hydrocarbon type. These tars from coal volatile matter are undesirable in a cyclic char fuel oxidation reactor as they tend to clog up the mechanical components of the expander and to foul any spark igniters used in the secondary reactor. Tars which are exhausted from the cyclic char fuel oxidation reactor plant are also an undesirable air pollutant material.

In prior art, steady pressure, gas producers tar formation from coal volatile matter has been successfully reduced by passing the primary reactant air first into the preheat and volatile matter distillation zone. The emerging volatile matter apparently reacts with oxygen in the air to form oxygenated hydrocarbon type materials which form much less tar. The resulting volatile matter-in-air mixture then passes into the rapid reaction zone. Within the rapid reaction zone the volatile matter-in-air mixture is apparently burned in appreciable part to fully reacted carbon dioxide and steam. The carbon dioxide and steam, plus any unreacted oxygen, then react with carbon in the rapid reaction zone to form producer gas which emerges from the primary reactor. One disadvantage of this method for reducing tar formation is that the initial burning of the volatile matter in air mixture on entering the rapid reaction zone creates very high temperatures there and ash fusion and clinkering may result. These clinkers clog up the motion of the char fuel along the char fuel motion direction and may encase carbon particles and thus prevent complete carbon gasification. Another disadvantage of this method for reducing tar formation is that the carbon dioxide and steam created by burnup of the volatile matter-in-air mixture, react much more slowly with hot carbon in the rapid reaction zone to form producer gas. In prior art, steady pressure, gas producers this latter disadvantage was overcome by use of deeper rapid reaction zones of larger cross sectional area so that the required producer gas reaction could be completed. But when primary producer gas reactors are to be used on cyclic char fuel oxidation reactor plants such large volume reactors are undesirable since very thick walls are needed on the pressure vessel containers. It would be very desirable to have available a method for reducing tar formation from high volatile matter char fuels which did not produce clinkers and did not require a large volume primary reactor.

In prior art cyclic char fuel oxidation reactors the ashes are removed from the ash collection zone of the primary reactor at the end of the char fuel motion path by an ash removal mechanism. Most such ash removal mechanisms remove a volume of material at intervals and it is necessary to control either the volume, or the interval, or both, so that only ashes, and no unburned char fuel, are removed. While such control means are feasible they are necessarily complex since it is difficult to sense the ash quantity and ash level existing within the ash collection zone. It would be desirable to have available an ash removal means which did not require such sensing of ash level within the primary reactor.

SUMMARY OF THE INVENTION

Within each of the primary reactors of a cyclic char fuel oxidation reactor flow of reactant air across the direction of motion of the char fuel is achieved. An air manifold is added with ports along the side of each primary reactor these ports connecting into preferably the full length of the char fuel motion path so that air enters one or more sides of the primary reactor distributed along the length of this motion path. One or more primary reacted gas reservoirs are added with ports on the opposite side of each primary reactor, these ports connecting into portions of the length of the char fuel motion path. For the producer gas reservoir the ports connect into the high temperature rapid reaction zone portion of the char fuel motion path where air is reacting with char fuel carbon to form producer gas. This producer gas then flows via these ports into the producer gas reservoir and is stored therein during the compression process. In this way the flow of air into and producer gas out of the primary reactor is in large part across the direction of motion of the char fuel though the primary reactor during compression.

During expansion the stored producer gas can reverse flow direction and flow out via the rapid reaction zone into the air manifold and thence into the expander. Alternatively the changeable gas flow connections to expander stages can be connected between the producer gas reservoir and the expander so that producer gas flows unidirectionally into the expander during expansion and does not reverse flow direction.

When high volatile matter char fuels, such as bituminous coal, are used this volatile matter is distilled out of the coal in the first, preheat and volatile matter distillation, portion of the char fuel motion path. For these coals a volatile matter in air mixture reservoir is added to each primary reactor with ports into this preheat and volatile matter distillation zone and opposite the ports from the air manifold. During compression air flows into the preheat and volatile matter distillation zone and mixes into the emerging volatile matter to form a volatile matter-in-air mixture which then flows into the volatile matter-in-air reservoir to be stored therein. In this way the flow of air into and volatile matter-in-air mixture out of the primary reactor is in large part across the direction of motion of the char fuel through the primary reactor during compression. Further the volatile matter-in-air mixture and the producer gas are largely separated in the two separate reservoirs.

As described above for the producer gas reservoir the flow of the volatile matter-in-air mixture out of its reservoir during expansion can be reversed, or can be unidirectional by connecting additional changeable gas flow connections from the volatile matter in air mixture reservoir and to the expander stages.

Tar reduction by mixing air into emerging coal volatile matter can be achieved by use of this invention without appreciable burnup of the volatile matter-in-air mixture since this mixture passes largely into the volatile matter-in-air reservoir and only small portions may enter the high temperature rapid reaction zone. In this way carbon dioxide formation is avoided and an excessively large primary reaction chamber is not required. Also excessive temperatures from burnup of volatile matter-in-air mixture and consequent ash fusion with clinker formation are also avoided. These are among the beneficial objects made available by the devices of this invention.

Each producer gas reservoir can be fitted with a particle separator means and the ash particles can then be allowed to carry over into the producer gas reservoir. Ash removal from the producer gas reservoir is simpler than from the ash collection end of the primary reactor since whatever is collected in the producer gas reservoir can be removed as ashes without concern for removing unburned char fuel from the primary reactor. Similar particle separator means can also be used in the volatile matter in air mixture reservoirs to separate such tar particles as are formed and these can then be removed by an ash removal type of mechanism. These are additional beneficial objects made available by the devices of this invention.

Where the principal product of a cyclic char fuel oxidation reactor plant is fuel gas the producer gas product can be kept separate from the volatile matter in air mixture product by use of two separate expanders. In this preferred way the differing product fuel gases can be used separately in differing applications to which each is best suited.

Where the principal product of a cyclic char fuel oxidation reactor plant is work output we may prefer to use a secondary reactor separate from the primary reactor. Complete combustion of both the volatile matter in air mixture and the producer gas is achieved within the secondary reactor and a supply of secondary air for burning the producer gas is stored for this purpose within a secondary air reservoir during compression.

BRIEF DESCRIPTION OF THE DRAWINGS

An example cyclic char fuel oxidation reactor plant is shown schematically in FIG. 1 and FIG. 5 with which the improved primary reactors of this invention can be used.

One form of primary reactor improved according to this invention is shown in FIG. 2.

Figure 3:
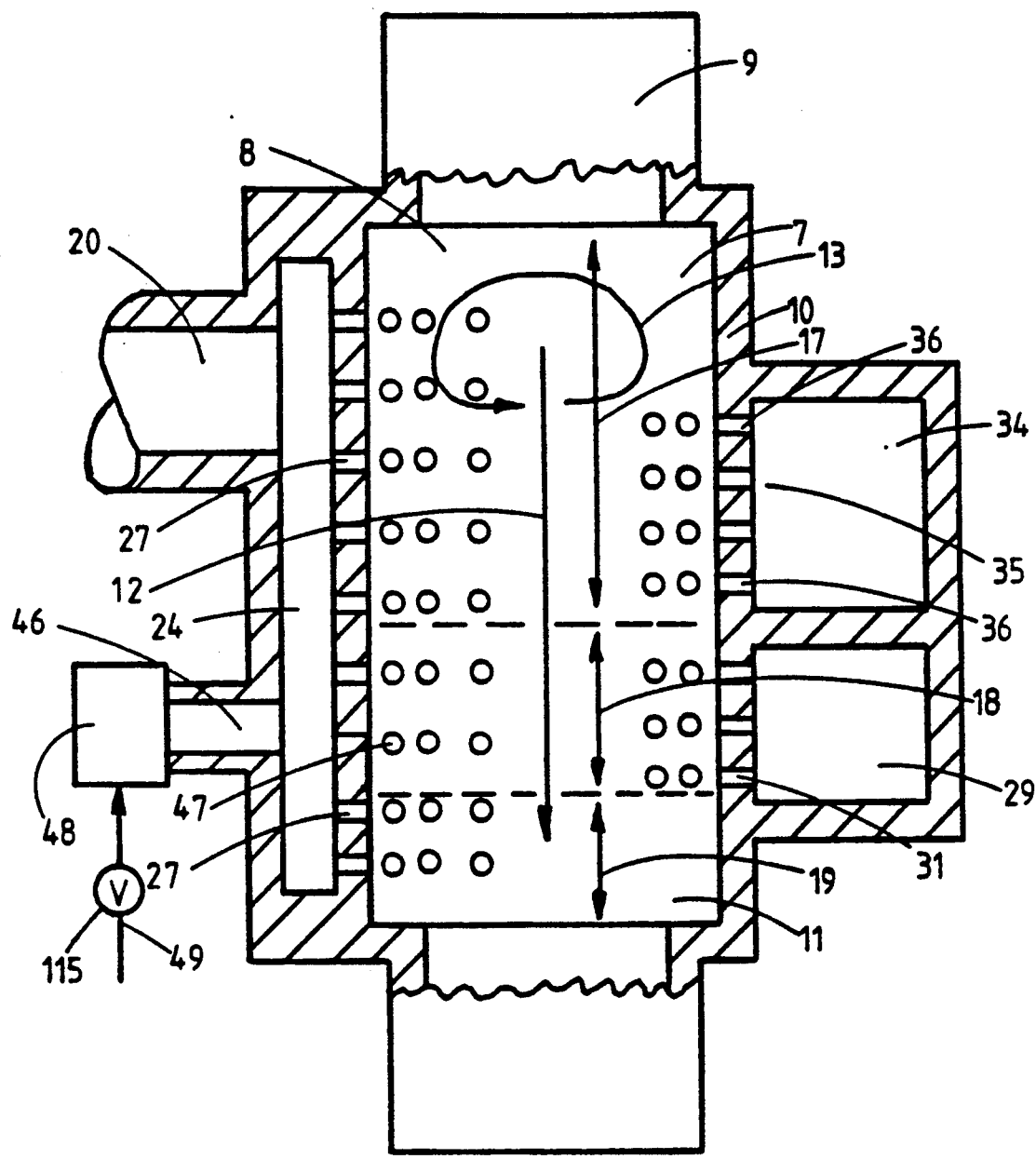

Another form of primary reactor improved according to this invention is shown in FIG. 3.

Figure 4:
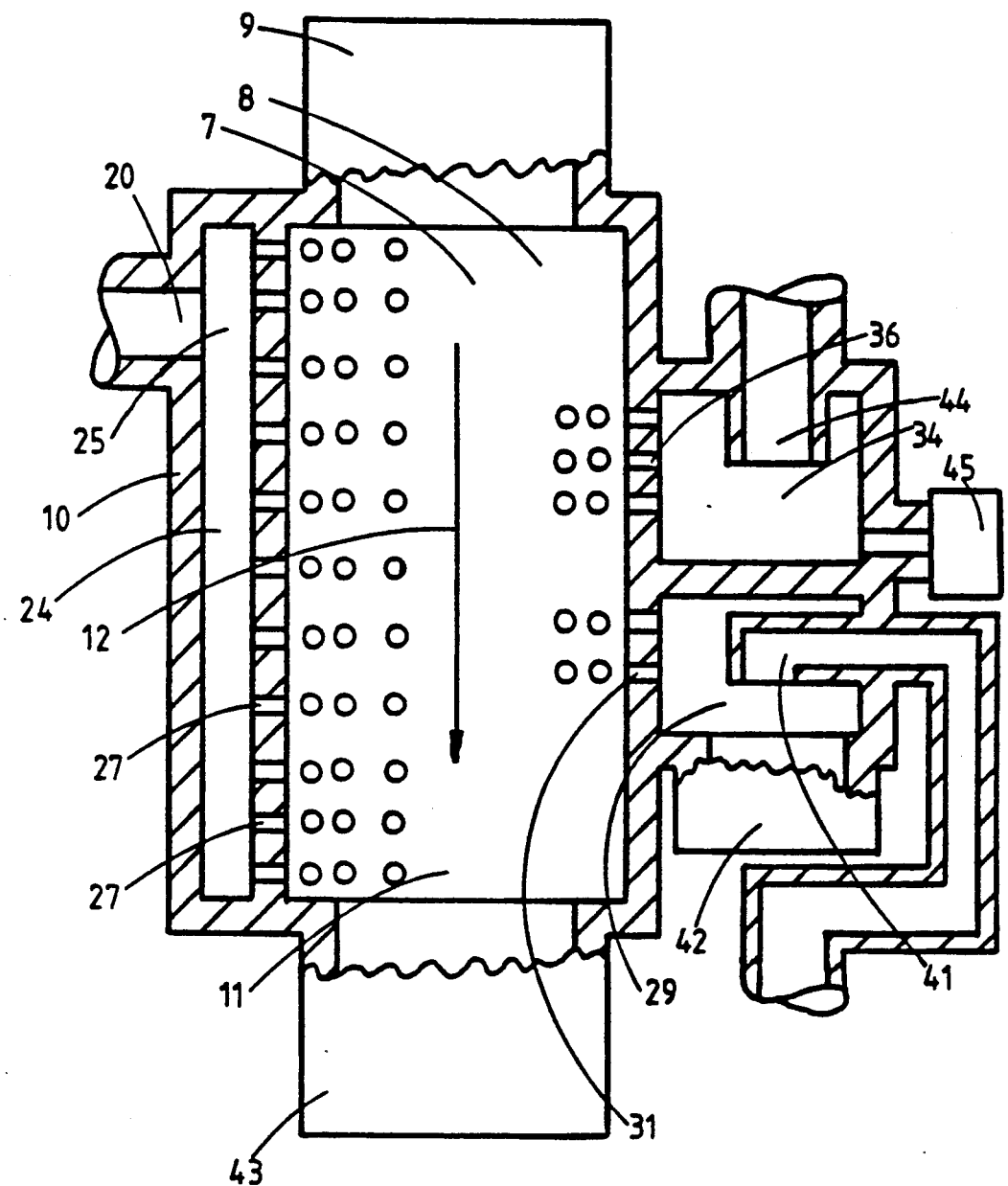

A unidirectional flow form of improved primary reactor is shown in FIG. 4.

Figure 6:
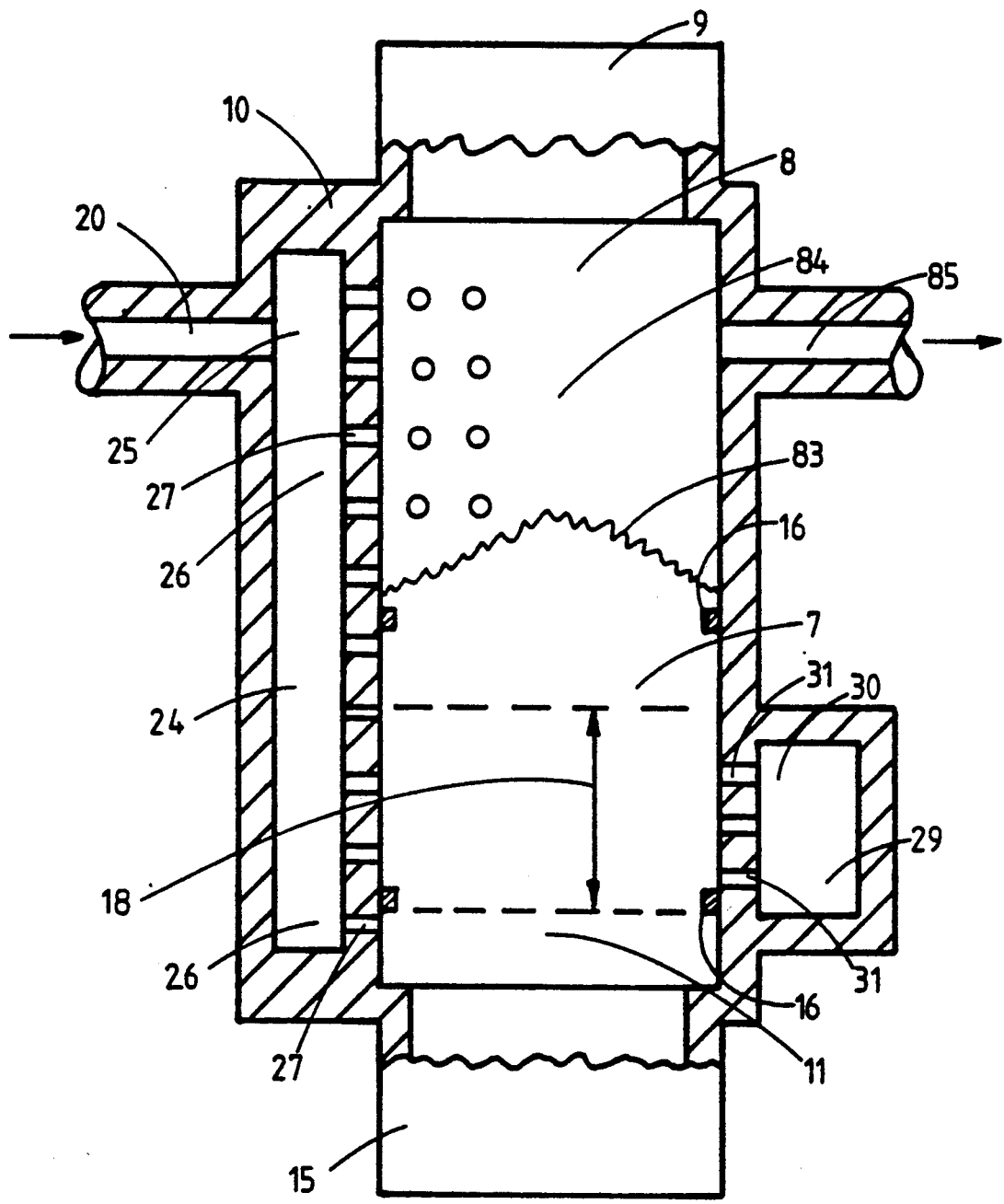

Another form of primary reactor improved according to this invention is shown in FIG. 6 wherein the primary reactor and the secondary reactor are contained within the same pressure vessel.

Figure 7:
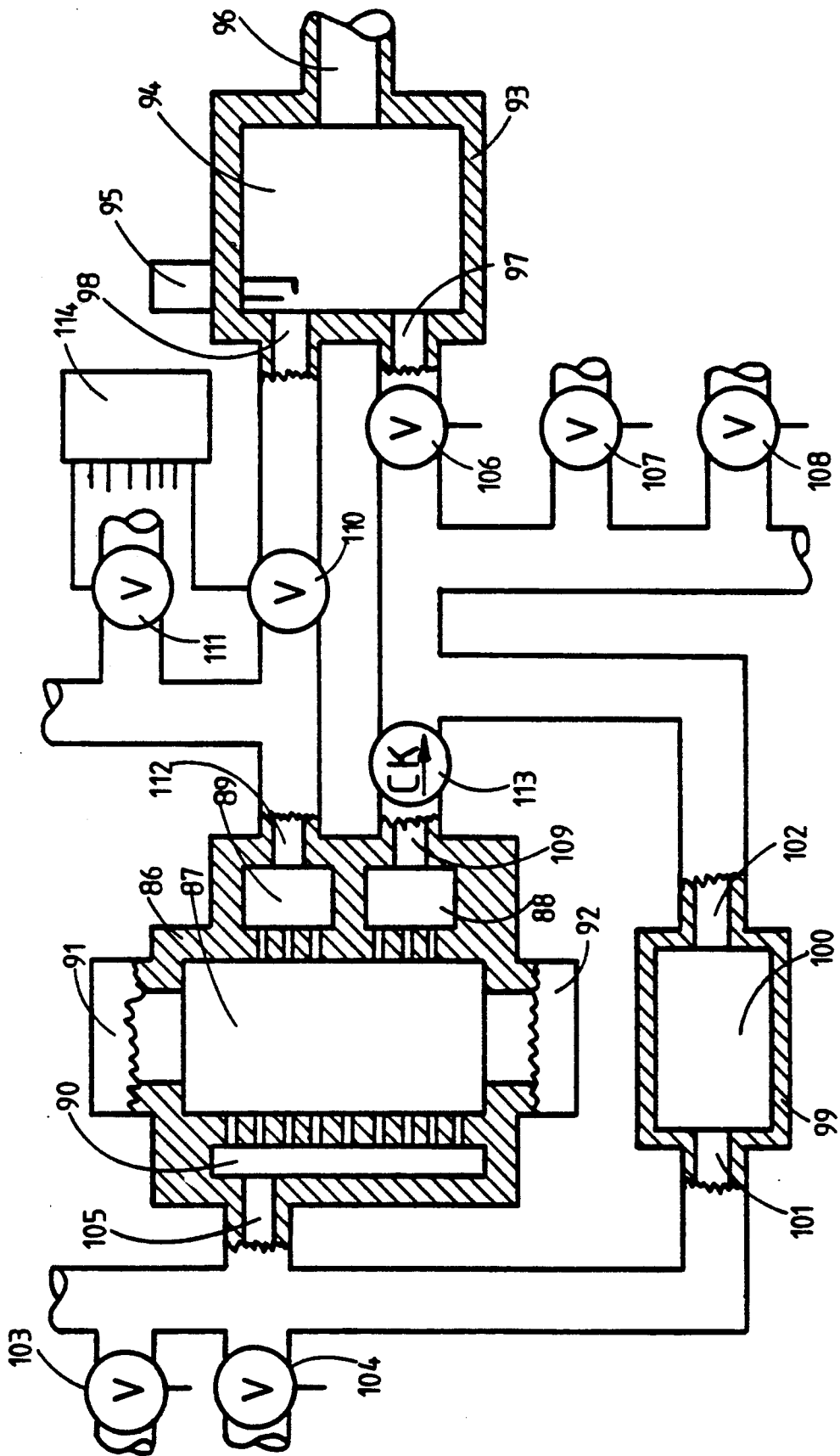

Another unidirectional flow form of improved primary reactor is shown in FIG. 7 wherein the primary reactor and the secondary reactor are contained within separate pressure vessels.

Figure 8:
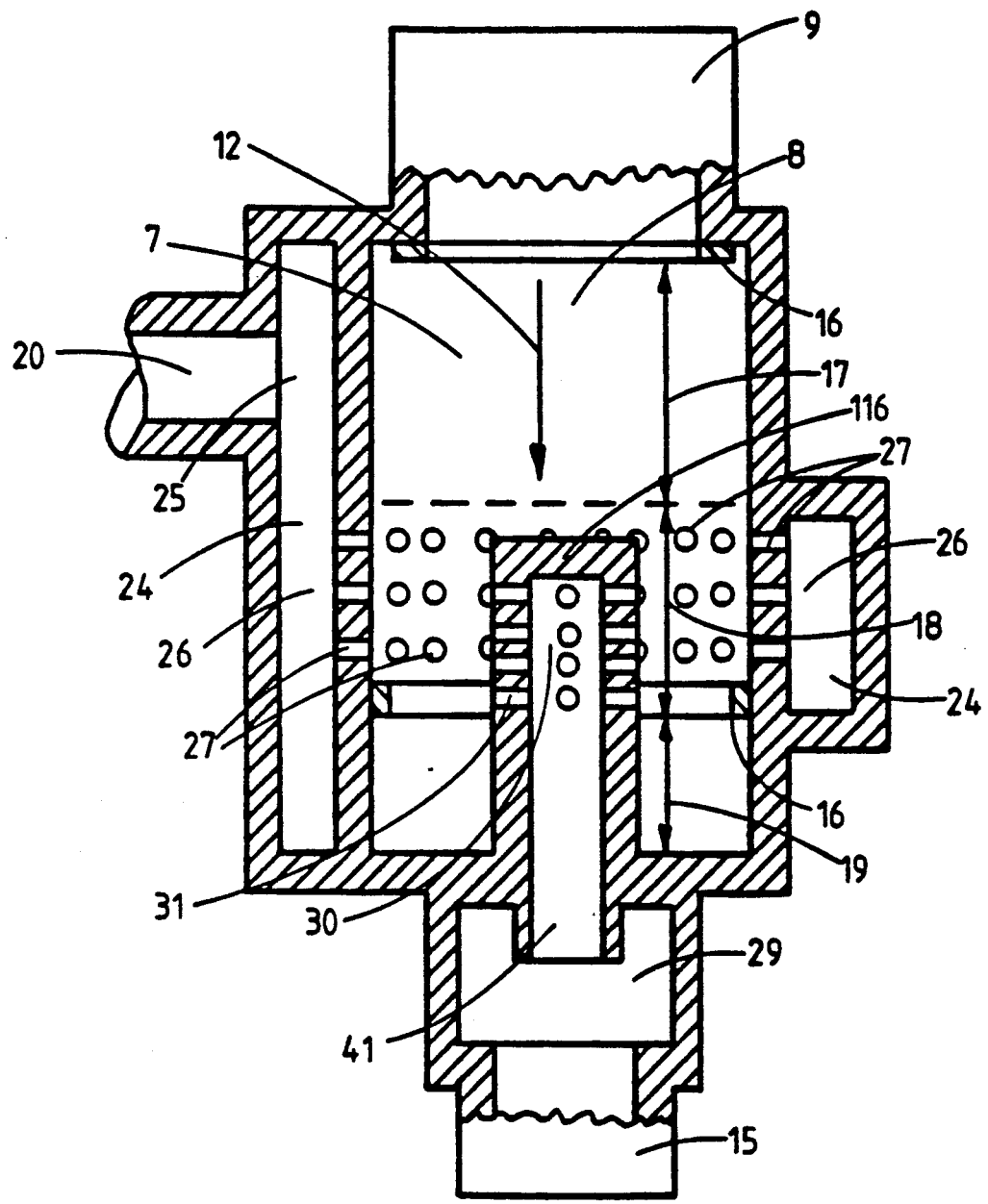

The improved primary reactor shown in FIG. 8 utilizes radial cross flow of gases in the rapid reaction zone.

DESCRIPTION OF THE PREFERRED EMBODIMENTS

Figure 1:
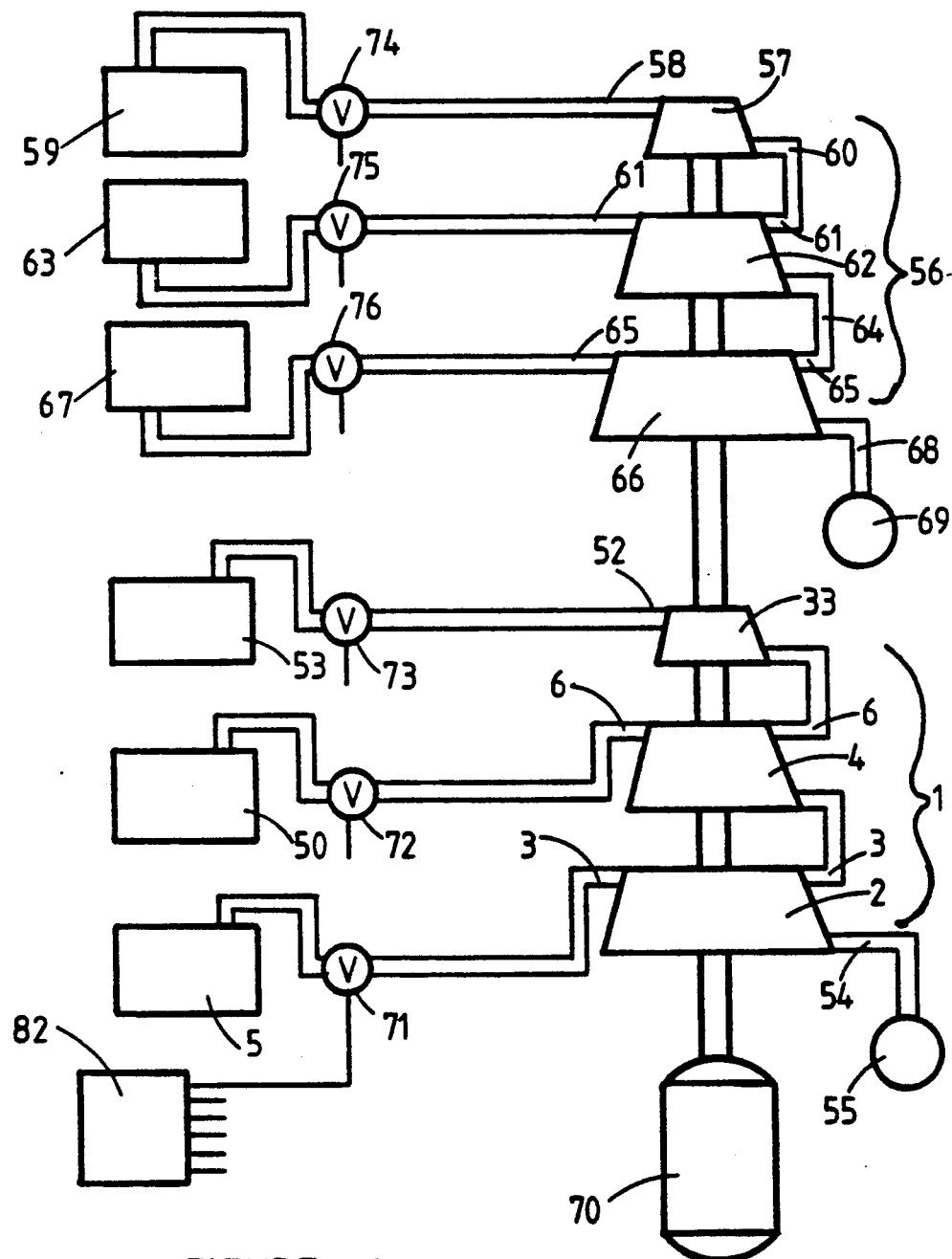
Figure 5:
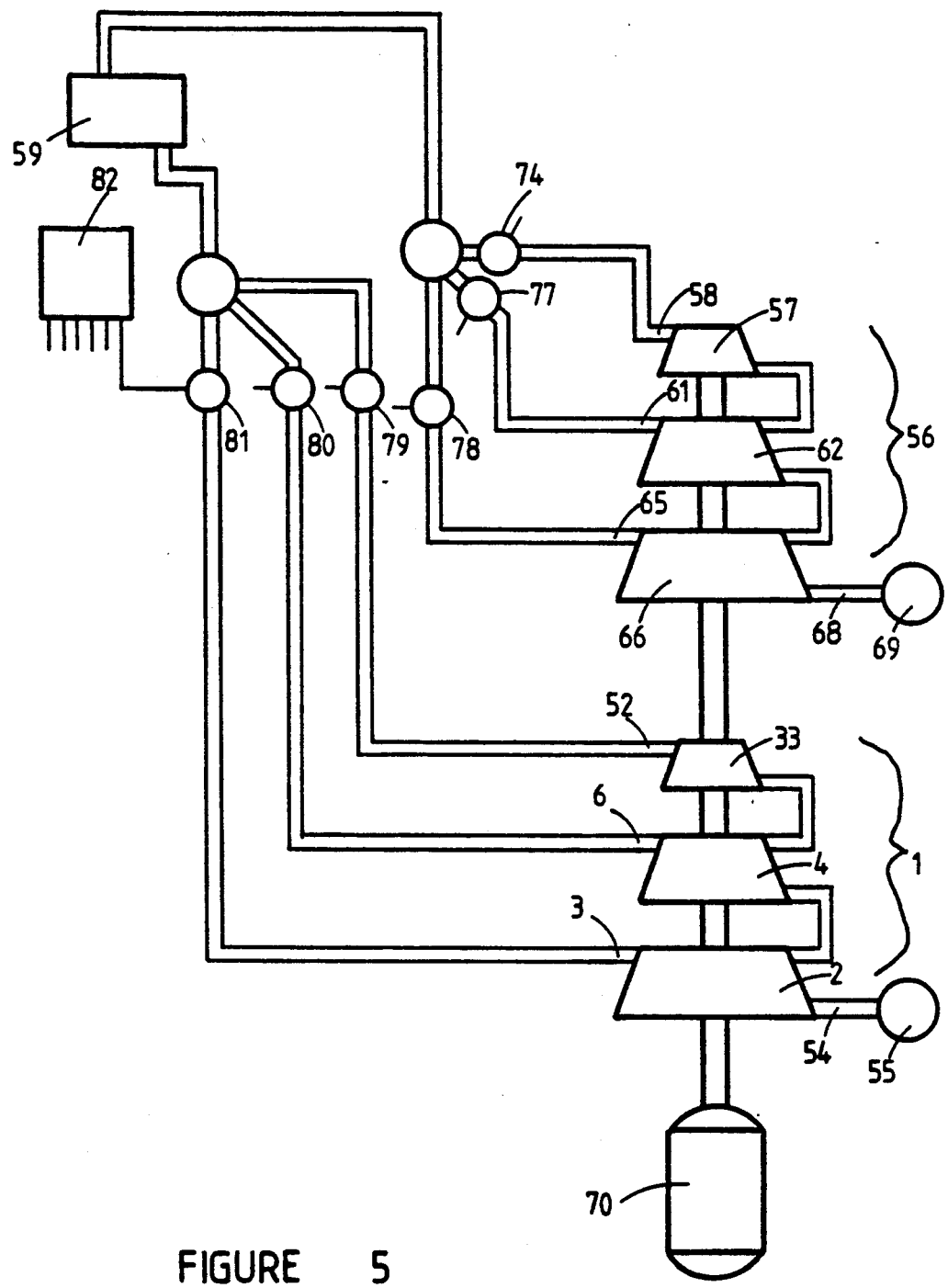

All forms of this invention are improvements to cyclic char fuel oxidation reactor plants, one example of such a plant is shown schematically in FIG. 1 and FIG. 5 and comprises:

1. A separate compressor means, 1, for compressing reactant gases into primary reactors, of three stages: a low pressure stage, 2, whose delivery end outlet, 3, connects to the input end of the intermediate pressure stage, 4, and also to primary reactor pressure vessel container, 5, containing a primary char fuel reaction chamber; an intermediate pressure stage, 4, whose delivery end outlet, 6, connects to the input end of the high pressure stage, 33, and also to the primary reactor pressure vessel container, 50, containing a primary char fuel reaction chamber; a high pressure stage, 33, whose delivery end outlet, 52, connects to the primary reactor pressure vessel container, 53, containing a char fuel primary reaction chamber. The inlet, 54, to the low pressure stage, 2, connects to a source, 55, of reactant gas containing appreciable oxygen gas, such as air.

2. A separate expander means, 56, for expanding reacted gases out of char fuel primary reaction chambers, of three stages: a high pressure stage, 57, whose inlet, 58, connects to primary reactor pressure vessel container, 59, containing a primary char fuel reaction chamber, and whose outlet, 60, connects to the inlet, 61, of the intermediate pressure stage, 62; an intermediate pressure stage, 62, whose inlet, 61, connects to a primary reactor pressure vessel container, 63, containing a char fuel primary reactor, and whose outlet, 64, connects to the inlet, 65, of the low pressure stage, 66; a low pressure stage, 66, whose inlet, 65, connects to a primary reactor pressure vessel container 67, containing a char fuel primary reactor, and whose outlet, 68, connects to a receiver, 69, of reacted and expanded gases.

3. A drive means, 70, for driving the compressor, 1, such as an electric motor. Where the expander, 56, is a work generating engine the drive means, 70, can also be a means for absorbing the expander work output in excess of that needed to drive the compressor, 1, such as an electric generator, and in this case the expander engine, 56, drives the compressor, 1, in whole or part.

4. A number of separate pressure vessel containers, with primary reactors, 5, 50, 53, 59, 63, 67, at least equal to the sum of the number of compressor stages plus the number of expander stages.

5. The connections between stages of the compressor, 1, and between stages of the expander, 56, are fixed open gas flow connections which remain open whenever the plant is operating.

6. The connections, 71, 72, 73, between compressor stage outlets, 3, 6, 52, and primary reactor pressure vessel containers are changeable gas flow connections which can be opened or closed while the plant is operating and comprise means for opening and closing. The connections, 74, 75, 77, between expander stage inlets, 58, 61, 65, and primary reactor pressure vessel containers are also similar changeable gas flow connections. Only some of these changeable gas flow connections between compressor stages, expander stages, and primary reactor pressure vessel containers are shown in FIG. 1, which shows a set of such connections opened for one particular time period of a sequence of time periods.

7. Each separate primary reactor pressure vessel container has separate changeable gas flow connections to each compressor stage outlet and to each expander stage inlet and these are shown for the one particular pressure vessel container, 59, in FIG. 5 as follows:
i. Changeable gas flow connections, 74, 77, 78, connect pressure vessel, 59, to expander stages, 57, 62, 66, respectively, when open;
ii. changeable gas flow connections, 79, 80, 81, connect pressure vessel, 59, to compressor stages, 33, 4, 2, respectively when open;

Each of the other primary reactor pressure vessel containers, 5, 50, 53, 63, 67, has similar separate changeable gas flow connections to compressor stage outlets and to expander stage inlets and not all of these are shown in FIG. 1 and FIG. 5 in order to avoid undue complexity of the drawings.

8. A control means, 82, operates on the means for opening and closing the several changeable gas flow connections so that the primary reactor pressure vessel container, 59, is open gas flow connected, in a sequence of time periods, first to each compressor stage outlet in time order of increasing stage outlet pressure in the order of stages, 2, 4, 33, then to each expander stage inlet in time order of decreasing stage inlet pressure in the order of stages, 57, 62, 66. The primary reactor pressure vessel container, 59, is thusly open gas flow connected to but one stage during any one time period of this sequence of time periods of open gas flow connections. This sequence of time periods of open gas flow connections is repeated for pressure vessel container, 59.

9. Each of the primary reactor pressure vessel containers, 5, 50, 53, 63, 67, is similarly open gas flow connected in a sequence of time periods, first to each compressor stage outlet in time order of increasing stage outlet pressure, next to each expander stage inlet in time order of decreasing stage inlet pressure, then this sequence of time periods is repeated, by action of the control means, 82. Each compressor stage outlet is open gas flow connected to but one primary reactor pressure vessel container during any one time period of the sequence of time periods, and each expander stage inlet is open gas flow connected to but one primary reactor pressure vessel container during any one such time period. Thus the several primary reactor pressure vessel containers, 5, 50, 53, 59, 63, 67, necessarily change connections at the same time and the time periods are the same for all primary reactor pressure vessel containers.

10. Each primary reactor pressure vessel container may contain only a primary reaction chamber or may additionally contain an integral secondary reaction chamber. For example, where the pressure vessel container is filled with char fuel only a primary reactor is contained. Alternatively, where the pressure vessel container is only partially filled with char fuel the space above the char fuel can be a secondary reactor where the secondary air, stored therein during compression, reacts with producer gas emerging from the primary reactor within the char fuel during expansion. In this latter case the primary reactor pressure vessel container outlet is preferably connected into the secondary reaction chamber.

11. An example primary reactor pressure vessel container is shown in cross section in FIG. 2 wherein only a primary reactor is contained within the pressure vessel container. The primary reaction chamber, 7, contains char fuel which is added into the refuel end, 8, thereof by a refuel mechanism, 9, and this primary reactor is enclosed within the pressure vessel container, 10, and comprises: an ash collection end 11; a char fuel direction of motion, 12, from the refuel end, 8 toward the ash collection end, 11, in which direction the char fuel moves as it is being reacted and consumed within the primary reactor 7; a peripheral dimension, 13, around the outer surface, 14, of the primary reactor 7, at right angles to the char fuel motion direction, 12; an ash removal mechanism, 15, which in this FIG. 1 and 2 example removes ashes from the ash collection end, 11, of the primary reactor, 7; a starting heater means, 16, for preheating the char fuel in the primary reactor, 7, up to that temperature at which it reacts rapidly with oxygen in adjacent compressed reactant gas when the engine is being started, electrodes, 16, being used to pass a heating electric current directly through the char fuel itself in the example starting heater shown in FIG. 2.

12. The fresh char fuel refueled into the refuel end, 8, of the primary reactor, 7, is cold, and will not react with compressed air, but is heated by conduction from those char fuel portions deeper into the primary reactor which are at a high temperature and are reacting rapidly with oxygen to create producer gas. Thus the first portion, 17, of the primary reaction chamber along the char fuel motion direction, 12, is a char fuel preheat zone, 17, and distillation of volatile matter takes place here also when char fuels containing volatile matter are being used. At the end of the preheat and volatile matter distillation zone, 17, the char fuel is at or above its rapid reaction temperature and enters the rapid reaction zone portion, 18, of the primary reaction chamber along the char fuel motion path, 12, where char fuel reacts rapidly with oxygen in adjacent compressed reactant gases to create a producer gas product, and the heat of this reaction maintains the rapid reaction zone at or above the char fuel rapid reaction temperature. Within the rapid reaction zone, 18, of the char fuel reactor, 7, the carbon of the char fuel is gasified to producer gas and leaves only the ashes which collect in the ash zone, 19, at the ash collection end, 11, of the char fuel motion path, 12.

The devices of this invention comprise additions to the separate primary reaction chamber, 7, of the cyclic char fuel oxidation reactor, as described hereinabove, an example being shown in FIG. 2:

13. A reactant gas manifold, 24, is added whose inlet, 25, connects to the several changeable gas flow connections to compressor stage outlets and expander stage inlets via the connection, 20. The outlet, 26, of the reactant gas manifold, 24, connects to several ports, 27, into the primary reaction chamber, 7. These reactant gas ports, 27, are positioned along at least that portion of the length of the char fuel motion path, 12, through the primary reactor, 7, which is adjacent to the rapid reaction zone, 18, and are positioned around an inlet portion, 28, of the peripheral dimension, 13 of the primary reactor. In some applications of this invention these reactant gas ports, 27, are positioned along essentially the whole length of the char fuel motion path, 12.

14. A producer gas reservoir, 29, is added whose inlet, 30, connects to several ports 31, into the primary reaction chamber, 7. These producer gas ports, 31, are distributed along that portion, 18, of the char fuel motion path, 12, adjacent to the rapid reaction zone of the char fuel, and are positioned around an outlet portion, 32, of the peripheral dimension, 13, of the primary reactor, 7.

15. The producer gas ports, 31, are preferably located on the side of the primary reactor opposite the reactant gas ports, 27, and the remaining portions of the primary reactor peripheral dimension, 13, are sealed and unported.

16. The producer gas ports, 31, and also the reactant gas ports, 27, preferably have at least one area cross section dimension which is smaller than the char fuel particles being refueled into the primary reactor, 7. These ports can be of various shapes such as round holes or elongated slots.

17. The primary reactor pressure vessel container, 10, shown in FIG. 2, uses the external connection, 20, as a combined inlet and outlet to and from the primary reactor, 7.

Figure 2:
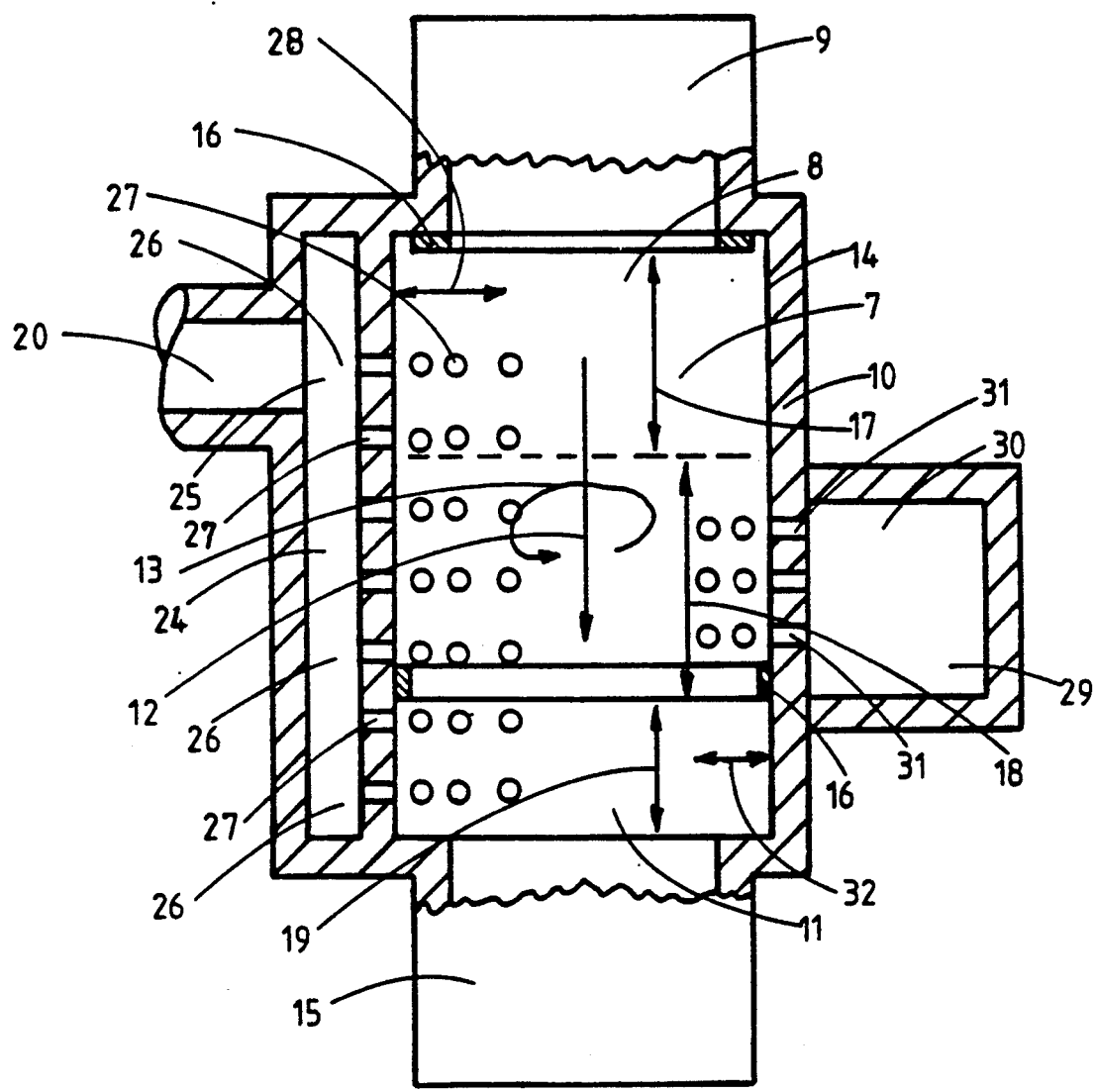

A cyclic char fuel oxidation reactor plant, using a modified primary reactor pressure vessel container of this invention as shown in FIG. 2, operates as follows:

18. When the cyclic char fuel oxidation reactor of FIG. 1 and FIG. 5 is to be started, an electric current is passed through the char fuel in the rapid reaction temperature. The compressor drive means, 70, then drives the compressor, 1, for starting and cycles of compression followed by expansion are commenced.

19. During compression compressed air flows from the connected compressor stage outlet, via the changeable gas flow connection into gas flow connection, 20, into the reactant gas manifold, 24, and thence via the reactant gas ports, 27, into and across the primary reaction chamber, 7. Within the rapid reaction zone, 18, air reacts rapidly with hot char fuel to form producer gas which flows via the producer gas ports, 31, into the producer gas reservoir, 29. Producer gas is thus stored during compression within the producer gas reservoir, 29, as well as within the pore spaces of the rapid reaction zone, 18.

20. During expansion producer gas flows out of the producer gas reservoir, 29, reaction zone, 18, into the reactant gas manifold, 24, via the reactant gas ports, 27, and into the connected expander stage inlet via the changeable gas flow connection into the gas flow connecting means, 20. For this FIG. 2 form of the invention the gas flow direction during expansion is thus the reverse of the flow direction during compression. The gas flows in considerable part also across the direction of motion, 12, of the char fuel through the primary reactor, 7.

21. This cycle of compression followed by expansion is repeated. The starting heater means, 16, is turned off when the heat of the primary producer gas reaction within the primary reactor, 7, is sufficient to maintain the char fuel at its rapid reaction temperature within the rapid reaction zone, 18. The drive means for starting is turned off when the net work of the cycle is sufficient to keep the compressor running.

22. With the scheme of this invention shown in FIG. 2 air enters the rapid reaction zone, 18, from above, from the side, and from below via the ash collection zone, 19. A large and stable rapid reaction zone is thusly created by this ready air access thereto. Additionally those air portions passing through the ash collection zone, 19, are preheated therein, in part by conduction from the hot ash particles, and in part by final burnup of any carbon reacting the ash collection zone. This preheated air elevates the char fuel temperature in the rapid reaction zone. In these ways full char fuel burnup is obtained, a large and stable rapid reaction zone is created, some of whose air supply is preheated and these are among the beneficial objects made available by use of the schemes of this invention.

The pressure vessel container, 10, of FIG. 2 contains only a primary reactor whose product reacted gas is producer gas and, when no secondary reactor is used, the cyclic char fuel oxidation reactor plant is a char fuel gasifier wherein producer gas leaves the lowest pressure expander stage, 66, and is delivered into the reacted gas receiver pipe, 69, for use as a fuel gas elsewhere.

In some applications of cyclic char fuel oxidation reactors work output of the expander is the desired product rather than a fuel gas output, as described above. For these work output applications the producer gas product of the primary reactor is mixed with secondary air and burned to complete combustion products within a secondary reaction chamber during expansion. One particular example of a secondary reactor, integral with the primary reactor within the pressure vessel container is shown in cross section in FIG. 6 and comprises the following:

1. The primary reaction chamber, 7, occupies that portion of the pressure vessel container, 10, filled with char fuel to the char fuel level, 83.

2. The secondary reaction chamber, 84, occupies that portion of the pressure vessel container, 10, above the char fuel level, 83, and not containing any char fuel.

3. The refuel mechanism, 9, refuel end, 8, ash collection end, 11, ash removal mechanism, 15, starting heater, 16, reactant gas manifold, 24, reactant gas ports, 27, producer gas reservoir, 29, producer gas ports, 31, rapid reaction zone, 18, etc., are essentially the same as described hereinabove for the FIG. 2 example of this invention.

4. The connection, 20, into the reactant gas manifold, 24, connects only to the several changeable gas flow connections to compressor stage outlets.

5. The connection, 85, into the secondary reaction chamber, 84, connects only to the several changeable gas flow connections to expander stage inlets.

6. Thus this FIG. 6 form of the invention uses a primary reactor pressure vessel container inlet, 20, separate from the container outlet, 85.

7. During compression compressed air flows from the connected compressor stage outlet via the changeable gas flow connection from compressor outlets into gas flow inlet connection, 20, into the reactant gas manifold, 24, and thence via the reactant gas ports, 27, into and across the primary reaction chamber, 7. Compressed air also flows into the integral secondary reaction chamber, 84, and is stored therein during compression. Within the rapid reaction zone, 18, of the primary reactor, 7, air reacts rapidly with hot char fuel to form producer gas which flows via the producer gas ports, 31, into the producer gas reservoir, 29. Producer gas is thus stored during compression within the producer gas reservoir, 29, as well as within the pore spaces of the rapid reaction zone, 18.

8. During expansion producer gas flows out of the producer gas reservoir, 29, reaction zone, 18, into the secondary reactor, 84, where it mixes with the secondary air stored therein and burns to complete combustion products. These complete combustion products leave the secondary reactor, 84, via the outlet connection, 85, and flow into the connected expander stage inlet via the changeable gas flow connection to expander inlets.

9. In this way complete combustion of the char fuel is achieved within each cycle of compression and expansion and the work output of this cycle is thus appreciably greater than when the producer gas is not thusly burned fully. Thus complete combustion gases leave the lowest pressure expander stage, 66, and are delivered into the reacted gas receiver, 69, which is an exhaust pipe for this work output application.

In addition to the foregoing elements, as described hereinabove, additional elements and modified elements can be used for various forms of this invention.

Another form of this invention, similar to the form shown in FIG. 2, is shown in FIG. 8 wherein the inlet, 30, to the producer gas reservoir, 29, is positioned radially centrally within the ash collection zone, 19, and the rapid reaction zone, 18. The producer gas outlet ports, 31, are positioned along the length of the primary reaction chamber, 7, in the direction of char fuel motion, 12, which is adjacent to the rapid reaction zone, 18. These producer gas ports, 31, can be positioned angularly uniformly around the periphery of the inlet, 30, and are at right angles to the char fuel motion direction, 12, so that fuel particles will not tend to be pushed through these producer gas ports. With this centrally positioned inlet to the producer gas reservoir, 29, ash particles will carry over through the ports, 31, into the reservoir, 29, and the ash removal mechanism, 15, is thus positioned to remove ashes collected in the producer gas reservoir, 29. Preferably that portion of the reactant gas manifold, 24, outlet, 26, with reactant gas ports, 27, into the rapid reaction zone, 18, uses as an inlet portion of the periphery of the primary reaction chamber, 7, essentially the full periphery so that the reactant gas manifold, 24, wraps fully around the primary reactor, 7, adjacent to the rapid reaction zone. In this way air, as reactant gas, flows radially across the direction of char fuel motion, 12, essentially angularly uniformly and the resulting producer gas exits from the central portions of the rapid reaction zone. With this radial cross flow pattern the char fuel volume in the rapid reaction zone which receives unreacted air is increased. The top, 116, of the inlet, 30, to the producer gas reservoir, 29, is capped to prevent char fuel entering therein and thus bypassing the rapid reaction zone, 18.

When the char fuel being used contains appreciable volatile matter, as for example in bituminous coal, an additional separate volatile matter in air mixture reservoir with ports connected into the preheat and volatile matter distillation zone may be preferred. One particular example of such a volatile matter in air mixture reservoir and ports form of this invention is shown schematically in FIG. 3 and comprises:

1. The separate primary reaction chamber, 7, with refuel end, 8, refuel mechanism, 9, pressure vessel container, 10, ash collection end, 11, char fuel motion direction, 12, peripheral dimensions, 13, char fuel preheat and volatile matter distillation zone, 17, rapid reaction zone, 18, ash zone, 19, connection, 20, to the several changeable gas flow connections to compress stage outlets and expander stage inlets, reactant gas manifold, 24, reactant gas inlet ports, 27, producer gas reservoir, 29, producer gas ports, 31, is essentially similar to that described hereinabove for the FIG. 2 form of this invention. For this form of the invention using a volatile matter in air mixture reservoir the reactant gas inlet ports, 27, are preferably positioned along essentially the whole length of the char fuel motion path, 12, through the primary reactor, and are at least positioned adjacent to the volatile matter distillation and preheat zone, 17.

2. A volatile matter in air mixture reservoir, 34, is added whose inlet, 35, connects to several ports, 36, into the primary reaction chamber, 7. These volatile matter in air mixture ports, 36, are distributed along that portion, 17, of the char fuel motion path, 12, adjacent to the preheat and volatile matter distillation zone of the char fuel, and are positioned around an outlet portion of the peripheral dimension, 13, of the primary reactor, 7.

3. The volatile matter in air mixture ports, 36, are preferably located on the side of the primary reactor, 7, opposite the reactant gas ports, 27, and these ports also have at least one area cross section dimension which is smaller than the char fuel particles being refueled into the primary reactor, 7.

The FIG. 3 form of this invention operates in the same manner as described hereinabove for the FIG. 2 form of invention except that those air portions entering the char fuel preheat and volatile matter distillation zone, 17, are mixed with the emerging char fuel volatile matter to form a volatile matter in air mixture during compression. The volatile matter in air mixture flows in part across the zone, 17, and into the volatile matter in air mixture reservoir, 34, via the ports, 36, during compression and is stored therein. During expansion the volatile matter in air mixture flows out of the volatile matter in air reservoir, 34, across the preheat and distillation zone, 17, into the reactant gas manifold, 24, via the reactant gas ports, 27, and into the several changeable gas flow connections to expander stage inlets via the gas flow connecting means, 20. In this way most of the volatile matter in air mixture is kept out of the rapid reaction zone and in consequence is not burned therein to carbon dioxide and water vapor. By this preventing or reducing the full combustion of the volatile matter in air mixture, appreciable formation of slow reacting carbon dioxide and water vapor within the rapid reaction zone is prevented, and the ash fusion and klinker formation consequent upon the high temperatures resulting from such full combustion are prevented or reduced. These are further beneficial objects made available by use of the FIG. 3 form of this invention.

Prior art, steady pressure, gas producers have also separated the volatile matter in air mixture from the rapid reaction zone as shown for example in the Westinghouse double zone gas producer. A description of this Westinghouse gas producer is presented in the book, *Gas Engines and Producers*, L. S. Marks and H. S. McDewell, American Technical Society, Chicago, 1919, on page 26 and 17 of the second, *Gas Producers* section therein. This Westinghouse gas producer utilizes gas flow principally along the direction of char fuel motion rather than across this motion direction.

The use of a central inlet to the producer gas reservoir, as described hereinabove, could in principal also be used for the inlet to the volatile matter in air mixture reservoir. However such a central inlet within the volatile matter distillation and preheat zone might interfere with the char fuel refueling process and restrict adequate supply of char fuel into the rapid reaction zone beyond the volatile matter distillation and preheat zone.

When the primary reactor, 7, fully occupies the pressure vessel container, 10, as shown in the example of FIG. 3, no secondary reaction occurs therein and thus the reacted gases leaving the container, 10, via the combined inlet and outlet, 20, are producer gas admixed and enriched with a volatile matter in air mixture. If this is also the final product of the cyclic char fuel oxidation reactor plant, it will be a fuel gas of generally higher heating value per unit volume than producer gas not thusly enriched. This is another beneficial object made available by use of the devices of this invention.

Of course a pressure vessel container, also comprising a volatile matter in air mixture reservoir, can additionally comprise an integral secondary reactor similar to that shown in FIG. 6 and in this case the outlet of the pressure vessel container is preferably separate from the inlet and connected into the integral secondary reactor as shown in FIG. 6.

Use of a secondary reaction chamber, separate from the pressure vessel container containing the primary reactor, may be preferred in some of those applications where work output is the desired product of the cyclic char fuel oxidation reactor plant. One particular example of such use of separate secondary reactors is shown schematically in FIG. 7 for one primary reactor pressure vessel container and for one expander stage of a cyclic char fuel oxidation reactor plant and comprises:

1. A first primary reactor pressure vessel container, 86, comprising a primary reactor, 87, fully occupying the container 86, and comprising a producer gas reservoir, 88, and ports, a volatile matter in air reservoir, 89, and ports, a reactant gas manifold, 90, and ports, a refuel mechanism, 91, an ash removal means, 92, and these elements are essentially similar to those described hereinabove. The first primary reactor pressure vessel container comprises two separate outlets: a first outlet, 109, connecting to the producer gas reservoir, 88; a second outlet, 112, connecting to the volatile matter in air reservoir, 89.

2. A second secondary reactor pressure vessel container, 93, comprising a secondary reaction chamber, 94, with igniter means, 95, an outlet connection, 96, integral with one expander stage inlet, a first inlet connection, 97, a second inlet connection, 98, connecting into the secondary reactor, 94, adjacent to igniter, 95.

3. A third pressure vessel container, 99, comprising, a reactant gas reservoir, 100, for storing secondary air during compression, an inlet, 101, an outlet, 102.

4. The second pressure vessel container in intergral with one expander stage inlet, and each expander stage inlet is thusly fitted with a separate integral secondary reactor.

5. The third pressure vessel container connects only to the first pressure vessel container containing the primary reactor, and each primary reactor of the cyclic char fuel oxidation reactor is thusly fitted with a separate reactant gas reservoir for the secondary air.

6. A first set of compressor changeable gas flow connections, 103, 104, which are the plant connections to the inlet, 105, of primary reactor pressure vessel container, 86, from each outlet of each compressor stage.

7. A second set of expander changeable gas flow connections, 106, 107, 108, which are the plant connections from the outlet, 109, of the producer gas reservoir, 88, of primary reactor pressure vessel container, 86, to each inlet of each expander stage but now connecting thereto via the first inlets, 97, of the secondary reactors, 94, whose outlets, 96, connect to the expander stage inlets.

8. A third set of added expander changeable gas flow connections, 110, 111, from the outlet, 112, of the volatile matter in air reservoir, 89, of the pressure vessel container, 86, to each inlet of each expander stage, but now connecting thereto via the second inlets, 98, of the secondary reactors, 94, and adjacent to the igniter means, 95. This third set of added expander changeable gas flow connections is defined as the first additional separate changeable gas flow connections in the claims.

9. The third pressure vessel container inlet, 101, is open gas flow connected to the inlet, 105, of the primary reactor pressure vessel container, 86. The third pressure vessel container outlet, 102, is open gas flow connected to the outlet, 109, of the producer gas reservoir, 88.

10. The plant control means, 114, for controlling the opening and closing of the first and second sets of several changeable gas flow connections from compressor stage outlets to primary reactor pressure vessel container inlets, and from primary reactor pressure vessel container outlets to expander stage inlets, is modified to comprise additional control means for controlling also the opening and closing of the third set of added expander changeable gas flow connections, so that:

i) Whenever a primary reactor pressure vessel container, 86, producer gas reservoir outlet, 109, is open gas flow connected to an expander stage inlet via its integral secondary reactor, 94, the volatile matter in air reservoir outlet, 112, of that same primary reactor pressure vessel container, 86, is also and concurrently open gas flow connected to that same expander stage inlet via its integral secondary reactor, 94.

ii) These additional control means are designated in the claims as the first additional control means for controlling the first additional separate changeable gas flow connections.

Using these elements and changeable gas flow connections and controls, the form of this invention shown in FIG. 7 operates as follows:

11. Both the primary reactor, 87, and the secondary air reservoir, 100, are supplied with air during the compression sequence of time intervals, and secondary air is thus stored within the reservoir, 100, during compression.

12. During the expansion sequence of time intervals the stored secondary air flows out of the reservoir, 100, mixes with the producer gas flowing out of the producer gas reservoir, 88, and the resulting fuel air mixture flows into the secondary reactor, 94, where it is burned to complete combustion products.

13. Also during the expansion sequence of time intervals the volatile matter in air mixture flows out of its reservoir, 89, and into the secondary reactor, 94, where it is ignited by the igniter means, 95 and burns to complete combustion products. This burning of the volatile matter in air mixture also functions to ignite the producer gas in air mixture entering the secondary reactor via the inlet, 97. This is one of the beneficial objects achieved by use of the FIG. 7 form of this invention, that the readily ignitable volatile matter in air mixture can be used to ignite the difficultly ignitable producer gas in air mixture.

14. The one primary reactor pressure vessel container, 86, is thusly connected to the one separate secondary reactor, 94, during only one time period of each sequence of time periods of open gas flow connections to expander stage inlets and compressor stage outlets. During the next following time period the primary reactor pressure vessel container, 86, will be open gas flow connected to that separate secondary reactor which is integral with the inlet to the next lower pressure expander stage. Alternatively, if container, 86, has completed all open gas flow connections to expander stage inlets it will either undergo refueling and ash removal or will be open gas flow connected to the first and lowest pressure compressor stage outlet during the next following time period. Each primary reactor pressure vessel container is similarly open gas flow connected, in a sequence of time periods, to compressor stage outlets and then to expander stage inlets via their integral secondary reactors.

15. To prevent backflow of air into the producer gas reservoir, 88, via the reactant gas reservoir, 100, during compression, it may be preferred in some forms of this invention to install a unidirectional flow means, 113, in the producer gas reservoir outlet, 109, which permits gas flow via the outlet, 109, only out of the producer gas reservoir, 88. This unidirectional flow means can be a simple pressure actuated check valve or a driven valve.

16. A more detailed description of the use of reactant gas reservoirs, such as the secondary air reservoir, 100, is presented in my U.S. Pat. No. 4,865,623, Reactant Gas Reservoirs for Cyclic Solid with Gas Reactors, issued Sep. 12, 1989, and this material is incorporated herein by reference thereto.

17. The particular example use of separate secondary reactors shown in FIG. 7 comprises both a producer gas reservoir, 88, and a volatile matter in air mixture reservoir, 89, on each primary reactor, 87. But primary reactors comprising a producer gas reservoir alone can also be used with separate secondary reactors and in this case the various changeable gas flow connections, 110, 111, etc., between volatile matter in air mixture reservoirs and separate secondary reactors are absent. Additionally in this case of a producer gas reservoir alone, the igniter, 95, in the secondary reactor, 94 is positioned adjacent to the producer gas inlet, 97, into the separate secondary reactor, 94.

18. Use of a secondary reactor separate from the primary reactor requires that the primary reactor operate always essentially filled with char fuel particles. Control of primary reactor refueling is thus greatly simplified since the refuel mechanism need only keep the primary reactor filled up and this is another beneficial object achievable by use of the FIG. 7 form of this invention.

19. Separate secondary reactors can also be used with those primary reactors utilizing a combined inlet and outlet, as shown for example in FIG. 2 and FIG. 3, wherein the gas flow during expansion is reversed from the flow during compression. In this case each secondary air reservoir can connect into the combined inlet and outlet of each primary reactor and no changeable gas flow connections are needed for this secondary air reservoir.

20. In some applications of cyclic char fuel oxidation reactor plants the several primary reactor pressure vessel containers comprise not only a primary reactor but also a steam boiler as described in my U.S. Pat. No. 4,455,837, Cyclic Velox Boiler, issued Jun. 26, 1984. For these applications the separate secondary reaction chamber can additionally comprise a pressure vessel liner with a steam or water flow path as a portion of the steam boiler heating surface.

21. Various types of igniter means, 95, can be used, such as electric sparks, glow plugs, burning gas air jets, etc., as is well known in the art of ignition of combustible fuel in air mixtures.

Char fuels vary greatly in the proportion of volatile matter they contain; fuels such as coke or anthracite containing little or no volatile matter, whereas fuels such as bituminous coal, wood, biomass, etc. may contain well in excess of fifty percent volatile matter by weight. Hence the ratio of the volume within which the volatile matter in air mixture is stored to the volume within which the producer gas is stored during compression is preferably different for different char fuels differing in volatile matter content. The optimum value of this volumes ratio is best determined experimentally for each char fuel in a running cyclic char burning oxidation reactor. Various criteria of optimization can be chosen. For example, in gasifier applications the product fuel gas energy content per unit volume could be maximized. For work output applications work output or efficiency could be maximized. An approximation of the best value for this volumes ratio can be estimated from the proximate and ultimate analysis of the char fuel, corrected to an ash and moisture free basis (maf basis), and using the following relations:

$$(GVR) = (GR)\left(\frac{MWP}{MWVMA}\right)\left(\frac{TVMA}{TPR}\right)$$

Wherein:

$$(GVR) = \frac{\text{(Vol. of Volatile Matter Air Mixture)}}{\text{(Vol. of Producer Gas)}} = \frac{(VVMA)}{(VPR)}$$

$(VVMA)$ = Volume of volatile matter in air mixture within its reservoir and within the preheat and distillation zone of the primary reactor at end of compression;

$(VPR)$ = Volume of producer gas within its reservoir and within the rapid reaction zone of the primary reactor at end of compression;

$$(GR) = \frac{\text{(Mass of Volatile Matter Air Mixture)}}{\text{(Mass of Producer Gas)}}$$

$$(GR) = \frac{12(n-F) + m + 16r + 4.76(29)\left(n - F + \frac{m}{4} - \frac{r}{2}\right)}{28F + 64s + (28)\left[3.76\left(\frac{F}{2} + s\right) + \frac{t}{2}\right]}$$

$$n = \frac{(C)(MWC)}{(12)(100)}$$

$$m = \frac{(H)(MWC)}{(100)}$$

$$r = \frac{(O)(MWC)}{(16)(100)}$$

$$s = \frac{(S)(MWC)}{(32)(100)}$$

$$t = \frac{(N)(MWC)}{(14)(100)}$$

$(MWC)$ = Assumed char fuel molecular weight. Values of 1000 to 10000 can be used here with no effect on volumes ratio.

$C$ = Wt. percent carbon by ultimate analysis of char fuel; (maf)

$H$ = Wt. percent hydrogen by ultimate analysis of char fuel; (maf)

$O$ = Wt. percent oxygen by ultimate analysis of char fuel; (maf)

$S$ = Wt. percent sulfur by ultimate analysis of char fuel; (maf)

$N$ = Wt. percent nitrogen by ultimate analysis of char fuel; (maf)

These molecular weights and weight percents are for a moisture and ash free char fuel (maf).

$$(F) = \frac{(FC)(MWC) - 32(s) - 14(t)}{12}$$

$(FC)$ = Wt. fraction fixed carbon by proximate analysis (maf) of char fuel;

$(MWP)$ = Average molecular weight of producer gas;

$$(MWP) = \frac{28F + 64s + 14t + 3.76\left(\frac{F}{2} + s\right)(28)}{F + s + \frac{t}{2} + 3.76\left(\frac{F}{2} + s\right)}$$

$(MWVMA)$ = Average molecular weight of volatile matter in air mixture assuming a stoichiometric ratio;

$(MWVMA) =$ $$\frac{138\left(n - F + \frac{m}{4} - \frac{r}{2}\right) + (12n - 12F + m + 16r)}{4.76\left(n - F + \frac{m}{4} - \frac{r}{2}\right) + \frac{(12n - 12F + m + 16r)}{(MWVM)}}$$

$(MWVM)$ = Average molecular weight of the volatile matter. Values between 100 and 5000 can be used here with very little effect on the estimated volumes ratio.

$(TVMA)$ = Average absolute temperature of the volatile matter in air mixture at maximum compression pressure;

$(TPR)$ = Average absolute temperature of the producer gas at maximum compression pressure;

Accurate estimations of each of these two average temperatures is difficult at best. However the ratio of these two temperatures can be roughly approximated as about two thirds. Those factors, such as external heat transfer or compression ratio, affecting each of these temperatures roughly proportionately.

$$\frac{(TVMA)}{(TPR)} = 0.66 \text{ approximately}$$

Where a cyclic char fuel oxidation reactor is to be used with various char fuels, differing in volatile matter content, the volume of one or both of the producer gas reservoir and the volatile matter in air mixture reservoir can be made adjustable, as by use of add on volumes, or by adjustable piston in cylinder volumes. Such adjustable reservoir volumes could also be used as a means for controlling work output since the extent of char fuel reaction per cycle varies directly with the gas volume reacted.

For prior art cyclic char fuel oxidation reactors ash removal mechanism, 43, means for removing ashes were used to remove ashes from the ash collection end, 11, of the primary reactor, 7, and this method can also be used for the present invention. Alternatively, or additionally, ashes can be carried over from the ash collection end, 11, into the producer gas reservoir, 29, and there separated from the gas and then removed from the producer gas reservoir. For this purpose the producer gas ports, 31, are made larger in cross section than the ash particles, a separator means, 41, for separating particles from the producer gas is placed in the producer gas reservoir, 29, and an ash removal mechanism, 42, is installed on the producer gas reservoir, 29, as shown schematically in FIG. 4. Various types of gas solid separators can be used as the separator means, 41, such as cyclone separators or other centrifugal force separators. It is simpler to remove ashes from the producer gas reservoir since whatever particles are collected there can be removed without fear of removing any reactable char fuel from the primary reaction chamber. The ash removal mechanism, 43, which removes ashes from the ash collection end, 11, of the primary reactor, 7, needs to be controlled so that only ashes and not char fuel are removed. In similar fashion a separator means, 44, for separating solid or liquid particles from the gaseous volatile matter in air mixture, can be installed in the volatile matter in air mixture reservoir, 34, together with an ash removal mechanism, 45, means for removing solid and liquid particles. Liquid tars are the principal material separated from the volatile matter in air mixture and a liquid drain valve or drain trap is one form of ash removal mechanism, 45, suitable for use here.

A richer producer gas of higher volumetric heating value can be created by admitting steam into the rapid reaction zone where the producer gas is formed This reaction of steam with hot carbon to form additional carbon monoxide and hydrogen fuels is endothermic and can thus also be used to prevent excessively high temperatures in the rapid reaction zone. We wish to thusly limit rapid reaction zone temperature in order to minimize ceramic liner durability problems and also ash fusion and klinker problems. But we only want steam into the rapid reaction zone. One scheme for accomplishing this preferred steam admission is shown schematically in FIG. 3 and comprises:

1. A steam admission connection, 46, into the reactant gas manifold, 24, adjacent to those reactant gas ports, 47, which connect into the rapid reaction zone, 18, and the ash zone, 19, of the primary reaction chamber, 7;

2. A steam admission controller, 48, which admits steam into the connection, 46, from a high pressure steam source, 49, only during compression; the controller, 48, also limits the mass ratio of steam to air entering the rapid reaction zone, 18, to values preferably averaging less than about 0.22, in order to avoid excessive chilling of the rapid reaction zone;

3. Examples of steam sources and steam admission controllers are described in my U.S. Pat. No. 4,484,531, on column 24, line 18 through column 25, line 26, and this material is incorporated herein by reference thereto. For purposes of this invention the controller further controls a changeable gas flow connection, 115, into each primary reactor, 7, so that steam is admitted thereinto only during compression.

Where the principal product of a cyclic char fuel oxidation reactor is fuel gas, we can utilize two separate expanders, each having the same number of stages, to keep the producer gas product separate from the volatile matter in air mixture product. For this separate expanders gasifier plant two sets of changeable gas flow connections to expander inlets are used as follows:

a. A first set of expander changeable gas flow connections between the producer gas outlets of all primary reactor pressure vessel containers and each inlet to each stage of the producer gas separate expander.

b. A second set of expander changeable gas flow connections between the volatile matter in air mixture outlets of all primary reactor pressure vessel containers and each inlet to each stage of the volatile matter in air separate expander.

c. The control means controls the opening and closing of these first and second sets of expander changeable gas flow connections so that: each primary reactor pressure vessel container has both outlets concurrently open gas flow connected separately first to the two high pressure stages of the two separate expanders for a first expander time period; and next to the two next lower pressure stages of the two separate expanders for a second time period and continuing thusly concurrently connecting to the corresponding pressure stages of the two separate expanders in time order of decreasing stage inlet pressure during subsequent time periods.

By thusly keeping the richer volatile matter in air mixture product separate from the leaner producer gas product we can utilize these two differing fuel gas products separately in differing applications for which each is best suited.

This two separate expanders scheme is similar to that form of separate secondary reactor scheme shown in FIG. 7, and described hereinabove, except that the connection, 97, is into the producer gas separate expander stage, and the connection, 98, is into the corresponding volatile matter in air mixture expander stage.

Having thus described my invention what I claim is:

1. in a cyclic char fuel oxidation reactor plant comprising:

a separate compressor means for compressing reactant gases comprising at least one stage and each said stage comprising an outlet pipe for reactant gases being compressed therein;

drive means for driving said compressor;

at least one separate expanded means for expanding reacted gases and each expander comprising at least one stage and each said stage comprising an inlet pipe for reacted gases to be expanded therein;

a source of reactant gas containing appreciable oxygen gas;

said compressor comprising an inlet to the lowest pressure stage thereof;

a fixed open gas flow connection from said compressor inlet to said source of reactant gas;

said expander comprising an outlet from the lowest pressure stage thereof;

at least one receiver of expanded reacted gas;

a fixed open gas flow connection from said expander outlet to said receiver of reacted gas;

means for absorbing any work output of said expander;

a number of primary reactor pressure vessel containers at least equal to the sum of the number of compressor stages plus the number of expander stages and each said primary reactor pressure vessel container comprising:

at least a primary char fuel reaction chamber within said primary reactor pressure vessel container;

an inlet to said primary reactor pressure vessel container;

at least one separate first outlet from said primary reactor pressure vessel container;

said primary char fuel reaction chamber comprising:
  a refuel end and an ash collection end;
  a refuel mechanism means for placing char fuel into said primary reactor via the refuel end thereof;
  a direction of char fuel motion within said primary reactor from said refuel end toward said ash collection end;
  a peripheral dimension around the outer surface of said primary reactor at right angles to said char fuel motion direction;
  a volatile matter distillation and char fuel preheat zone positioned toward said refuel end of said primary reactor;
  an ash collection zone positioned toward said ash collection end of said primary reactor;
  a rapid reaction zone positioned between said volatile matter distillation and char fuel preheat zone and said ash collection zone;
  at least one means for removing ashes from said primary reactor;
  means for preheating said char fuel within said primary reactor to that temperature at which said char fuel reacts rapidly with oxygen in adjacent compressed reactant gases when said cyclic char fuel oxidation reactor plant is being started;

means for driving said compressor means when said cyclic char fuel oxidation reactor plant is being started;

several separate changeable gas flow connections, comprising means for opening and closing, from each compressor stage outlet pipe to each primary reactor pressure vessel container inlet and from each expander stage inlet to each primary reactor pressure vessel container first outlet;

control means for controlling said means for opening and closing said several separate changeable gas flow connections so that: each said primary reactor pressure vessel container is open gas flow connected, in a sequence of time periods, first to each compressor stage outlet in time order of increasing stage outlet pressure, then to each expander stage inlet in time order of decreasing stage inlet pressure; each compressor stage outlet is open gas flow connected to but one primary reactor pressure vessel container during any one time period of said sequence of time periods, and each expander stage inlet is open gas flow connected to but one primary reactor pressure vessel container during any one time period of said sequence of time periods, and each primary reactor pressure vessel container is open gas flow connected to but one stage during any one time period of said sequence of time periods; said sequence of time periods of open gas flow connections to compressor stage outlets and to expander stage inlets is repeated for each said primary reactor pressure vessel container;

an improvement comprising:

dividing said peripheral dimension of said primary reactor into a separate inlet portion, a separate outlet portion and separate sealed portion;

adding to each said primary reactor:

a reactant gas manifold comprising an inlet and an outlet, said outlet connecting to reactant gas inlet ports into said primary reaction chamber, and these ports positioned along at least that portion of the length of said primary reaction chamber in said direction of char fuel motion which is adjacent to said rapid reaction zone, and these ports also positioned around only said inlet portion of the periphery of said primary reaction chamber;

a producer gas reservoir comprising an inlet and a separate outlet, said inlet connecting to producer gas outlet ports out of said primary reaction chamber, and these ports positioned along that portion of said length of said primary reaction chamber along said direction of char fuel motion which is adjacent to said rapid reaction zone;

wherein all of said reactant gas inlet ports and also all of said outlet ports are smaller in at least one area cross section dimension than the char fuel particles being refueled into said primary reaction chamber;

a fixed open gas flow connection from said primary reactor pressure vessel container inlet only to said reactant gas manifold inlet;

a fixed open gas flow connection from said primary reactor pressure vessel container first outlet only to said producer gas reservoir outlet.

2. In a cyclic char fuel oxidation reactor plant as described in claim 1, and further comprising:

a volatile matter in air mixture reservoir comprising an inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone;

wherein said volatile matter in air ports are smaller in at least one area cross section dimension than the char fuel particles being refueled into said primary reaction chamber;

wherein said volatile matter in air mixture reservoir comprises an outlet separate from said inlet;

wherein said fixed open gas flow connection from said primary reactor pressure vessel container outlet connects only to said producer gas reservoir outlet and said volatile matter in air mixture reservoir outlet.

3. In a cyclic char fuel oxidation reactor plant as described in claim 1 and further comprising:

a number of added secondary reactor pressure vessel containers, equal to the number of expander stages, and each said secondary reactor pressure vessel comprising: at least one first inlet, an outlet with a fixed open gas flow connection only to one expander stage inlet, a secondary reactor comprising an igniter means for igniting fuel gas in air mixtures, and each expander stage inlet having a fixed open gas flow connection only to the outlet of but one secondary reactor pressure vessel container, said first inlet to said secondary reactor pressure vessel container connecting to said several separate changeable gas flow connections from each said primary reactor pressure vessel container first outlet to said expander stage;

each primary reactor further comprising:

a third reactant gas reservoir pressure vessel container comprising an inlet and a separate outlet;

a fixed open gas flow connection from said inlet of said third reactant gas reservoir pressure vessel container to said inlet of said primary reactor pressure vessel container;

wherein said fixed open gas flow connection from said primary reactor pressure vessel container first outlet connects only to said producer gas reservoir outlet and said outlet of said third reactant gas reservoir pressure vessel container.

4. In a cyclic char fuel oxidation reactor plant as described in claim 3 and further comprising:

a volatile matter in air mixture reservoir comprising an inlet and a separate outlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone;

wherein said volatile matter in air ports are smaller in at least one area cross section dimension than the char fuel particles being refueled into said primary reaction chamber;

wherein each said secondary reactor pressure vessel container further comprises a second separate inlet connecting into said secondary reactor adjacent to said igniter means;

wherein each said primary reactor pressure vessel container comprises a second separate outlet;

wherein said second separate outlet of said primary reactor pressure vessel container has a fixed open gas flow connection only to said separate outlet of said volatile matter in air mixture reservoir;

first additional separate changeable gas flow connections, comprising means for opening and closing, from each said second separate outlet of each said primary reactor pressure vessel container to each said second separate inlet of each said secondary reactor pressure vessel container;

first additional control means for controlling said means for opening and closing said first additional separate changeable gas flow connections so that: said first additional changeable gas flow connections are opened and closed, concurrently for each said primary reactor, with those changeable gas flow connections from said primary reactor pressure vessel container first outlets to said first secondary reactor pressure vessel container inlets.

5. In a cyclic char fuel oxidation reactor plant as described in claim 3 and further comprising:

a volatile matter in air mixture reservoir comprising an inlet and a separate outlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber;

wherein said reactant gas inlet ports into said primary reaction chamber are positioned along at least that portion of the length of said primary reaction chamber in said direction of char fuel motion which is adjacent to said rapid reaction zone and said volatile matter distillation zone;

wherein said volatile matter in air ports are smaller in at least one area cross section dimension than the char fuel particles being refueled into said primary reactor;

wherein said fixed open gas flow connection from said primary reactor pressure vessel container first outlet connects only to said producer gas reservoir outlet and said volatile matter in air mixture reservoir outlet, and said outlet of said third reactant gas reservoir pressure vessel container.

6. In a cyclic char fuel oxidation reactor plant as described in claim 1, and further comprising;

a supply of steam;

steam means for delivering steam from said steam supply into said reactant gas manifold, adjacent to those reactant gas inlet ports which admit air into said rapid reaction zone, so that said steam delivery occurs only when that primary reactor inlet is open gas flow connected to a compressor stage outlet.

7. In a cyclic char fuel oxidation reactor plant as described in claim 1, wherein;

said producer gas reservoir comprising means for separating solid and liquid particles from said producer gas;

said ash removal mechanism means for removing ashes comprising means for removing collected solid and liquid materials from at least one of said ash collection end, said producer gas reservoir.

8. In a cyclic char fuel oxidation reactor plant as described in claim 5:

wherein said separate outlet of said producer gas reservoir further comprises a unidirectional flow means for permitting gas flow only out of said producer gas reservoir via said outlet;

wherein said separate outlet of said volatile matter in air mixture reservoir further comprises a unidirectional flow means for permitting gas flow only out of said volatile matter in air mixture reservoir via said outlet.

9. In a cyclic char fuel oxidation reactor plant as described in claim 3:

wherein said separate outlet of said producer gas reservoir further comprises a unidirectional flow means for permitting gas flow only out of said producer gas reservoir via said outlet.

10. In a cyclic char fuel oxidation reactor plant as described in claim 2:

wherein said fixed open gas flow connection from said primary reactor pressure vessel container first outlet connects only to said producer gas reservoir outlet;

wherein each said primary reactor pressure vessel container comprises a second separate outlet;

wherein said second separate outlet of said primary reactor pressure vessel container has a fixed open gas flow connection only to said separate outlet of said volatile matter in air mixture reservoir;

wherein said cyclic char fuel oxidation reactor plant comprises two separate expander means each having the same number of stages, a producer gas separate expander means, and a volatile matter in air mixture separate expander means;

wherein said changeable gas flow connections from said primary reactor pressure vessel container first outlets connect only to said inlets of each stage of said producer gas expander means;

wherein said producer gas separate expander means comprises a separate outlet from the lowest pressure stage thereof;

wherein said volatile matter in air mixture separate expander means comprises a separate outlet from the lowest pressure stage thereof;

and further comprising;

a receiver of expanded producer gas;

a receiver of expanded volatile matter in air mixture;

a fixed open gas flow connection from said producer gas receiver to said separate outlet of said producer gas expander means;

a fixed open gas flow connection from said volatile matter in air mixture receiver to said separate outlet of said volatile matter in air mixture expander means;

first additional separate changeable gas flow connections, comprising means for opening and closing, from each said second separate outlet of each said primary reactor pressure vessel container to each said inlet of each stage of said volatile matter in air mixture separate expander means;

first additional control means for controlling said means for opening and closing said first additional separate changeable gas flow connections so that: when a primary reactor first outlet is open gas flow connected for a time period to one particular stage of said producer gas expander means, the second outlet of that same primary reactor is open gas flow connected for that same time period to the corresponding particular stage of said volatile matter in air mixture expander means.

11. In a cyclic char fuel oxidation reactor plant as described in claim 1:

wherein said inlet of said producer gas reservoir is positioned approximately radially central within said ash collection zone and said rapid reaction zone;

wherein said producer gas outlet ports are positioned along the length of said primary reaction chamber, in said direction of char fuel motion, which is adjacent to said rapid reaction zone, and approximately angularly uniformly around the periphery of said producer gas reservoir inlet at right angles to said char fuel motion direction;

wherein said separate inlet portion of the peripheral dimension of said primary reactor encompasses essentially the full periphery for those reactant gas inlet ports positioned adjacent to said rapid reaction zone.

12. In a cyclic char fuel oxidation reactor plant as described in claim 11 and further comprising:

a volatile matter in air mixture reservoir comprising an outlet and a separate inlet, said inlet connecting to volatile matter in air mixture outlet ports out of said primary reaction chamber, and these ports positioned along that portion of said length of said primary reaction chamber along said direction of char fuel motion which is adjacent to said volatile matter distillation zone, and these ports also positioned around only said outlet portion of the periphery of said primary reaction chamber; said volatile matter in air outlet ports being smaller in at least one area cross section dimension than the char fuel particles being refueled into said primary reaction chamber:

wherein said reactant gas inlet ports into said primary reaction chamber are positioned along at least that portion of the length of said primary reaction chamber in said direction of char fuel motion which is adjacent to said rapid reaction zone and said volatile matter distillation zone;

wherein said fixed open gas flow connection from said primary reactor pressure vessel container first outlet connects only to said producer gas reservoir outlet and said volatile matter in air mixture reservoir outlet.

13. In a cyclic char fuel oxidation reactor plant as described in claim 11, wherein:

said producer gas reservoir comprises means for separating solid and liquid particles from said producer gas;

said ash removal mechanism means for removing ashes comprises means for removing collected solid and liquid materials from said producer gas reservoir.

* * * * *